United States Patent
Koshy et al.

(10) Patent No.: US 8,990,882 B1
(45) Date of Patent: *Mar. 24, 2015

(54) PRE-CALCULATING AND UPDATING DATA LOSS PREVENTION (DLP) POLICIES PRIOR TO DISTRIBUTION OF SENSITIVE INFORMATION

(75) Inventors: Ajil Koshy, Pune (IN); Milind Torney, Pune (IN); Manish V. Pai, Pune (IN)

(73) Assignee: Symantec Corporation, Mountain View, CA (US)

( * ) Notice: Subject to any disclaimer, the term of this patent is extended or adjusted under 35 U.S.C. 154(b) by 355 days.

This patent is subject to a terminal disclaimer.

(21) Appl. No.: 13/341,041

(22) Filed: Dec. 30, 2011

(51) Int. Cl.
*G06F 17/00* (2006.01)

(52) U.S. Cl.
USPC .............................................. 726/1; 713/165

(58) Field of Classification Search
USPC .............................................. 726/1; 713/165
See application file for complete search history.

(56) References Cited

U.S. PATENT DOCUMENTS

| | | | |
|---|---|---|---|
| 8,286,253 B1* | 10/2012 | Lu et al. | 726/26 |
| 8,365,243 B1* | 1/2013 | Lu et al. | 726/1 |
| 8,446,607 B2* | 5/2013 | Zucker et al. | 358/1.14 |
| 8,555,383 B1* | 10/2013 | Marshall et al. | 726/22 |
| 2012/0084868 A1* | 4/2012 | Julisch | 726/26 |
| 2012/0159565 A1* | 6/2012 | Bray et al. | 726/1 |
| 2012/0240183 A1* | 9/2012 | Sinha | 726/1 |
| 2013/0097709 A1* | 4/2013 | Basavapatna et al. | 726/25 |

\* cited by examiner

*Primary Examiner* — Amare F Tabor
(74) *Attorney, Agent, or Firm* — Lowenstein Sandler LLP (57) ABSTRACT

A method and apparatus submitting information to be protected before permitting an outbound data transfer with the information is described. A DLP agent, incorporating a DLP submission tool, receives information of an outbound data transfer by the client computing system. The DLP agent can temporarily block the outbound data transfer and send a request to update a DLP policy to protect the information before permitting the outbound data transfer. The DLP agent subsequently receives receiving an indication that the DLP policy is updated to protect the information. After receiving the indication, the DLP agent permits the outbound data transfer.

20 Claims, 6 Drawing Sheets

PRE-CALCULATING AND UPDATING DATA LOSS PREVENTION (DLP) POLICIES PRIOR TO DISTRIBUTION OF SENSITIVE INFORMATION

TECHNICAL FIELD

Embodiments of the invention relate to the field of processing data, and more particularly, to data loss prevention of sensitive information.

BACKGROUND OF THE INVENTION

A modern organization typically maintains a data storage system to store and deliver sensitive information concerning various significant business aspects of the organization. Sensitive information may include data on customers (or patients), contracts, deliveries, supplies, employees, manufacturing, or the like. In addition, sensitive information may include intellectual property (IP) of an organization such as software code developed by employees of the organization, documents describing inventions conceived by employees of the organization, etc.

Organizations invest significant efforts in installing DLP components, especially on important machines where confidential data is getting generated, but they may not be able to protect each computer in the enterprise, due to reasons like large number of different platforms or operating systems (OS), machine outages, quick and dynamic provisioning of virtual machines, no clear and individual accounting for test and lab machines. DLP technologies apply configurable rules to identify objects, such as files, that contain sensitive data and should not be found outside of a particular enterprise or specific set of host computers or storage devices. Even when these technologies are deployed, it is possible for sensitive objects to 'leak'. Occasionally, leakage is deliberate and malicious, but often it is accidental too. For example, in today's global marketplace environment, a user of a computing system transmits data, knowingly or unknowingly, to a growing number of entities outside a computer network of an organization or enterprise. Previously, the number of entities were very limited, and within a very safe environment. For example, each person in an enterprise would just have a single desktop computer, and a limited number of software applications installed on the computer with predictable behavior. More recently, communications between entities may be complex and difficult for a human to monitor.

Conventional DLP systems typically use three methods to detect sensitive information in unstructured data (such as documents): 1) described content matching (e.g. regular expressions, keyword dictionaries); 2) fingerprinting; and 3) machine-learning based content classification. These methods are effective when the information to be protected is exactly known, or can be described exactly using regular expressions and/or keyword dictionaries. Similar content has been used for training the machine-learning based classifier. These methods lose their effectiveness the moment there is new information which is sensitive but is not known to the DLP system a-priori. For example, in a software development firm new design documents are created frequently, and most of the time the content to be protected is completely new to the DLP system, which then is not able to identify the protected content. These methods do not perform a blanket identification of such design documents so that they may be protected from data loss. Similarly, pay statements are generated for each employee every month but they are all unique and unknown to the DLP systems. Currently such information is protected using described content matching techniques (e.g. regular expressions, keyword dictionaries) but their effectiveness is limited and they have a high rate of false positives.

There are conventional DLP products that allow classification of email messages by assigning TAGS (such as updating SMTP headers etc). In these products, the sender typically classifies the email message by attaching some TAG before sending it to others. For example, a CEO wants to send an internal and confidential email message to employees of an organization, but the content of the email message cannot leave the organization. However, using the conventional DLP products, an employees may not be able to forward this email message to their private mail account because of email filters detecting the TAG, but the employee may be able to still print out the email message, copy and paste the content into a document, and send the document outside of the organization as an attachment to circumvent the email filters. Thus, the TAGS can be lost or circumvented.

SUMMARY OF THE INVENTION

A method and apparatus for submitting information to be protected before permitting an outbound data transfer with the information is described. In one exemplary embodiment of a method, a DLP agent executing on a client computing system receives information of an outbound data transfer by the client computing system. The DLP agent can temporarily block the outbound data transfer and send a request to update a DLP policy to protect the information before permitting the outbound data transfer. The DLP agent subsequently receives receiving an indication that the DLP policy is updated to protect the information. After receiving the indication, the DLP agent permits the outbound data transfer.

In one embodiment, the DLP agent receives a submission from an email client plug-in executing in connection with an email application executing on the client computing system. The submission may include an email message with the information and the request to update the DLP policy to protect the information before permitting the email message. In another embodiment, the DLP agent receives a submission from a browser plug-in executing in connection with a browser application executing on the client computing system. The submission request may include a web transfer with the information and the request to update the DLP policy to protect the information before permitting the web transfer. In another embodiment, the DLP agent receives a submission via a user interface provided by the DLP agent. The submission may include a designation that the information of the outbound data transfer be protected by the DLP policy. The DLP agent can then create the request to be sent to a DLP system to update the DLP policy to protect the information. In another embodiment, the DLP user interface can be a custom user interface or any plug-in provided for third-party integration. For example, the user interface may be a plug-in for Microsoft Outlook, and the plug-in integrates with the Outlook user interface. Alternatively, the plug-in may be used with an internet application.

In one embodiment, the request includes the information of the outbound data transfer to be protected, category information associated with the information to be protected, and expiration information associated with the information to be protected. In another embodiment, the request includes instructions to a mail server to temporarily block email messages from an email account that satisfy one or more conditions, and instructions to the DLP system to update the DLP policy to protect the information before permitting the email messages from being routed to their destinations.

In yet a further embodiment, the DLP agent may receive a second indication that the request is rejected by an approval process on a server computing system. In one embodiment, the approval process can be a manual approval process via a user interface. In another embodiment, the approval process can be an automated process that uses rules configured on the DLP submission tool (server side). Alternatively, the approval process may be done in other ways as would be appreciated by one of ordinary skill in the art having the benefit of this disclosure.

In addition, a computer readable storage medium for identifying information as protected information is described. An exemplary computer readable storage medium provides instructions, which when executed on a processing system causes the processing system to perform a method such as the exemplary methods discussed above.

Further, systems and apparatus of a DLP submission tool are described. An exemplary apparatus may include a memory and a processor coupled to the memory. The processor is configured to execute the DLP submission tool to perform various operations, such as those described above.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for submitting information to be protected before permitting an outbound data transfer with the information is described. In the following description, numerous details are set forth. It will be apparent, however, to one of ordinary skill in the art having the benefit of this disclosure, that embodiments of the present invention may be practiced without these specific details.

Figure 1:
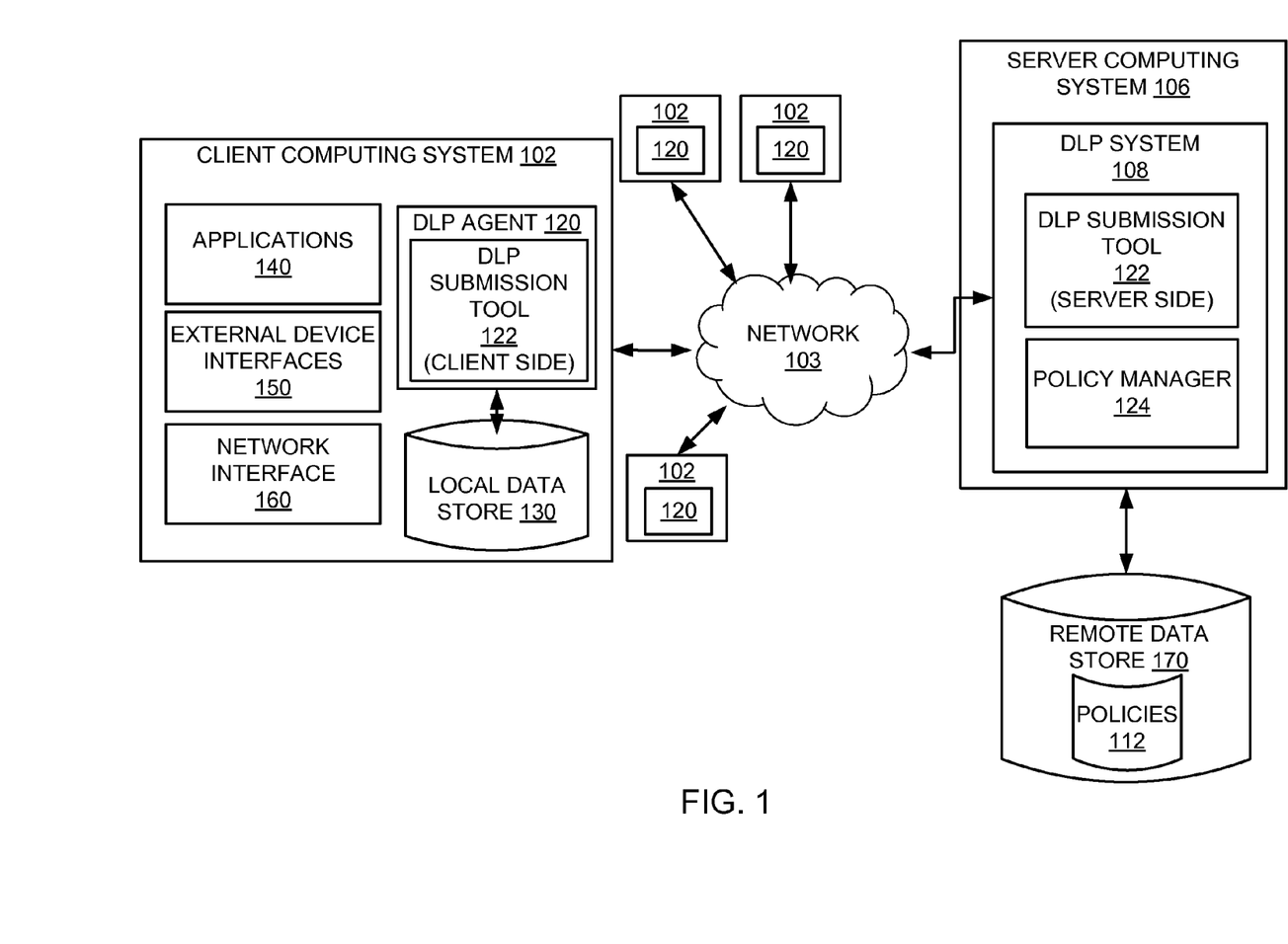
FIG. 1 is a block diagram of exemplary network architecture in which embodiments of a DLP submission tool may operate.

FIG. 1 is a block diagram of an exemplary network architecture 100 in which embodiments of a DLP submission tool 122 may operate. The network architecture 100 may include multiple client computing systems 102 and a server computing system 106 coupled via a network 103 (e.g., public network such as the Internet or private network such as a local area network (LAN)). The client computing system 102 may include personal computers, laptops, PDAs, mobile phones, network appliances, etc. The server computing system 106 may be a network appliance, a gateway, a personal computer, etc. The client computing systems 102 and the server computing system 106 may reside on the same LAN, or on different LANs that may be coupled together via the Internet, but separated by firewalls, routers, and/or other network devices. In another embodiment, the computing systems may reside on different networks. In the depicted embodiment, the server computing system 106 may host a DLP system 108, which may include another instance of the DLP submission tool 122 (server-side). Alternatively, the functionality of the DLP submission tool 122 can be distributed over the two machines. In other embodiments, the server computing system 106 may host one of the DLP system 108 and the DLP submission tool 122 and another server computing system (not illustrated) may host the other one. Alternatively, other configurations are possible as would be appreciated by one of ordinary skill in the art having the benefit of this disclosure. In one embodiment, the client computing systems 102 and server computing systems 106 may be part of an organization, such as a corporate enterprise. Alternatively, the server computing system 106 and the computing systems 102 may be part of different organizations.

The DLP system 108 may communicate with DLP agents 120. Although the embodiments may be used in a DLP system using DLP agents 120, the embodiments may also be used in other DLP components as would be appreciated by one of ordinary skill in the art having the benefit of this disclosure. For example, in one embodiment, the DLP submission tool 122 is run on the client computing system 102. In another embodiment, the DLP submission tool 122 is run on the server computing system 106. Alternatively, some of the functionality of the DLP submission tool 122 is performed on the client computing system 102, while other functionality of the DLP submission tool 122 is performed on the server computing system 106. It should also be noted that the DLP submission tool 122 can be implemented in other configurations, such as within the DLP system 108. Also, the embodiments described herein may be used in other applications that can be used for performing DLP submission tool operations as would be appreciated by one of ordinary skill in the art having the benefit of this disclosure.

In one embodiment, the DLP agent 120 monitors outbound data transfers by the client computing system 102. The DLP system 108 may communicate with DLP agents 120 on the client computing systems 102 to perform operations to enforce a DLP policy as described herein. The DLP agent 120 is configured to detect a violation of a DLP policy in the outbound data transfers. If the DLP agent 120 detects the violation, the DLP agent 120 may prevent the data transfer and may report the violation to the DLP system 108. For example, the DLP agent 120 may create an incident record of the violation, and may send the incident record to the DLP system 108, for example. The DLP system 108 is configured to receive the incident record of the violation from the DLP agent 120. In these embodiments, the DLP agent 120 creates the incident records. However, in other embodiments, any other DLP component may be used to detect a violation and create an incident, and it is not limited to using DLP agents on an endpoint, as described herein. It should also be noted that other systems than DLP systems can use the DLP submission tool 122 as part of enforcing the DLP policies.

In addition to monitoring the outbound data transfers, the DLP agent 120 may perform various methods of receiving submissions for updating the DLP policies, such as described below with respect to FIGS. 2A-3B. The DLP agent 120 and the DLP system 108 may utilize various DLP techniques to detect violations. In one embodiment, the DLP system 108 has a policy manager 124 that can be used to define and manage policies 112. The policy manager 124 can receive input from an administrator via a user interface to define the DLP policies 112 that are stored in the remote data storage 170. In another embodiment, the policy manager 124 can receive submissions from the DLP submission tools 122 on one or more client computing systems 102. The DLP system 108 may use various DLP techniques for the DLP policies. In one embodiment, the DLP system 108 uses indexed document matching (IDM). In another embodiment, the DLP system 108 uses exact data matching (EDM). In other embodiments, the DLP system 108 may use content matching (e.g., e.g. regular expressions, keyword dictionaries), fingerprinting, or the like. In other embodiments, the DLP system 108 uses data change map (DCM), vector machine learning (VML), or other types of DLP techniques as would be appreciated by one of ordinary skill in the art having the benefit of this disclosure. Using the DLP submission tools 122, the DLP system 108 can identify information that should be protected that has not been previously identified in the DLP policy or without a priori knowledge of the information. This allows the DLP agent 120 to protect information that has not been added to DLP policies yet or information that is not specifically identified as being protected by the DLP policies. Operations of the DLP submission tool 122 are described below with respect to FIGS. 2A-3B.

Although only one server computing system 106 is illustrated in FIG. 1, the DLP system 108 may be hosed on one or more machines, including one or more server computers, client computers, gateways or other computing devices. In yet another configuration, the DLP service may reside on a single server, or on different servers, coupled to other devices via a public network (e.g., the Internet) or a private network (e.g., LAN). In one embodiment, the DLP system 108 is part of an organization's system referred to herein as entity. In another embodiment, a service provider hosts the DLP system 108. The hosted service provider may also have multiple instances of the DLP system 108 on multiple networks that communicate with the service provider over a public or private network. It should be noted that various other network configurations can be used including, for example, hosted configurations, distributed configurations, centralized configurations, etc.

The depicted client computing system 102, which may operate as an endpoint machine in an enterprise network that uses the DLP system 108 to enforce one or more DLP policies, includes a DLP agent 120 that communicates with the DLP system 108. The client computing system 102 may include applications 140, external device interfaces 150, and network interfaces 160 that can be monitored by the DLP agent 102 as would be appreciated by one of ordinary skill in the art having the benefit of this disclosure. Alternatively, the DLP agent 102 can monitor other aspects of the client computing system 102 to monitor outbound data transfers. The client computing system 102 may also include a local data store 130, which can be one or more centralized data repositories that store the violation information, DLP policy information, and the like. The local data store 130 may represent a single or multiple data structures (databases, repositories, files, etc.) residing on one or more mass storage devices, such as magnetic or optical storage based disks, tapes or hard drives. Although illustrated as being local to the client computing system 102, the local data store 130 may be remote from the client computing system 102 and the client computing system 102 can communicate with the local data store 130 over a public or private network.

Figure 2A:
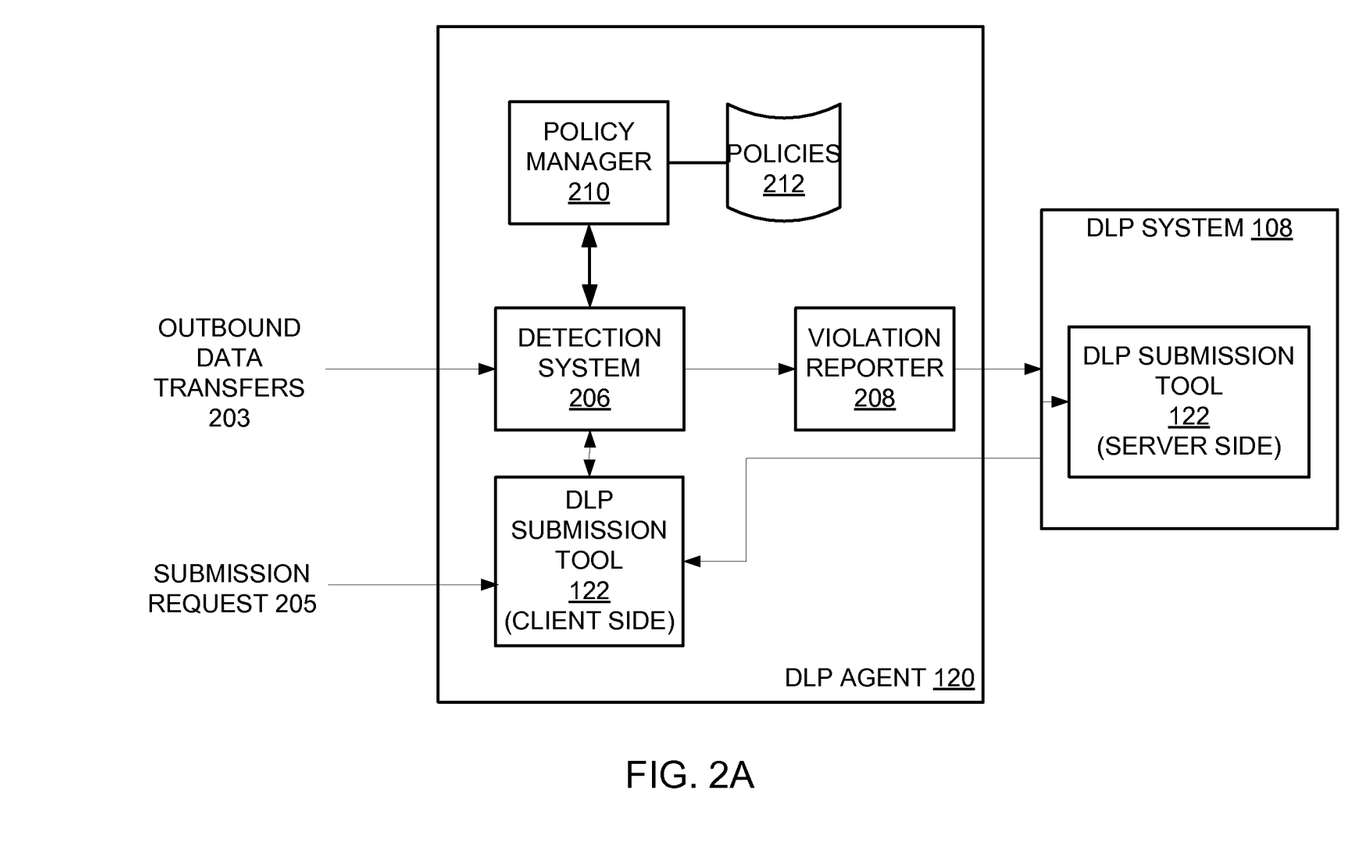
FIG. 2A is a block diagram of one embodiment of a DLP agent 120, including the DLP submission tool 122 to update a DLP policy to protect information of outbound data transfers.

FIG. 2A is a block diagram of one embodiment of a DLP agent 120, including the DLP submission tool 122 to update a DLP policy to protect information of outbound data transfers. The DLP agent may include a detection system 206, a policy manager 210, and a violation reporter 208. In the depicted embodiment, the detection system 206 is configured to monitor outbound data transfers 203. The outbound data transfers 203 may include data in transit, such as data associated with outgoing messages or other network traffic being sent by the client computing system 102 to a destination entity. The outbound data transfers 203 may also include data being printed, copied to a remote storage device, such as USB drive, a remote disk, or the like. The outbound data transfers 203 may be any data being transferred by the client computing system 102 via a wireless or wired connection to a destination entity, such as another device or to a remote device, such as, for example, a removable storage drive. The outbound data transfers 203 may be over the network 103 or over direct connections to the client computing system 102.

The detection system 206 is configured to determine whether the data transfers 203 violate a DLP policy. The detection system 206 may use any one or more of the three methods to detect sensitive information as described above, such as 1) described content matching (e.g. regular expressions, keyword dictionaries); 2) fingerprinting; and 3) machine-learning based content classification. However, there may instances where the information to be protected is not known exactly, or cannot be described exactly using regular expressions and/or keyword dictionaries. For example, there may be instances where there is new information which is sensitive but is not known to the DLP system a-priori. For the example given above, the software development firm new design documents are created frequently, and most of the time the content to be protected is completely new to the DLP system 108, which then is not able to identify the protected content. In one embodiment, the detection system 206 is configured to use the DLP submission tool 122 (client side) to submit information in the outbound data transfer 203 to be protected by the DLP policies 112 before distribution of the outbound data transfer 203. The DLP submission tool 122 may be used in connection with specific outbound data transfers 203. For example, an email client plug-in may send an email message as the outbound data transfer 203 and also send a submission request 205 together. In another embodiment, the DLP submission tool 122 may be used without being specifically tied to any one outbound data transfer 203.

In some embodiments, the DLP submission tool 122 may receive information from the outbound data transfer 203, as well as a submission request 205. The DLP submission tool 122 may communicate with the DLP submission tool 122 (server side) or the DLP system 108 to update the DLP policies with the information in the outbound data transfer. In one embodiment, the DLP submission tool 122 (client side) send a request to the DLP system 108 to update the policy to protect the information, and the DLP system 108 creates and updates the policies. In another embodiment, the DLP submission tool 122 creates the DLP policy or addition to an existing policy and sends the updated DLP policy to the DLP system 108 to be enforced within the organization. In another embodiment, the DLP submission tool 122 receives input from a user via a user interface to designate which information is to be protected, conditions for the protection, category information, expiration information, or other information that can be used to update the DLP policy to protect the information in the outbound data transfer. In other embodiments, the request may also contain information such as criticality of the data, action to be taken on data leak detection (e.g., block, allow, warn, ask user to allow or block or any such configured action). When the DLP system 108 updates the DLP policy, the DLP system 108 can send an indication back to the DLP submission tool 122 to indicate that the policy is updated. The DLP submission tool 122 may instruct the detection system 206 to allow the outbound data transfer. This assumes that the outbound data transfer 203 does not already violate other DLP policies. The DLP submission tool 122 can be used to identify information to be protected by the DLP policy. Further operations of the DLP submission tool 122 are described below with respect to FIG. 3A.

The detection system 206 may also be used to detect the DLP policies and may perform some remedial or notification operation to help enforce the DLP policies. In some embodiments, when the detection system 206 considers the data transfer as insecure (e.g., detects a violation of the DLP policy), the detection system 206 can pause the data transfer and alert a user or an administrator. For example, the detection system 206 can generate an alert for a user to approve or deny the data transfer. Similarly, the alert can be provided to an administrator to approve or deny the data transfer.

In one embodiment, when the detection system 206 detects the violation, the violation reporter 208 creates an incident record of the violation, and sends the incident record to the DLP system 108 and/or stores the incident record in the local data store 130. The violation reporter 208 can send the incident records as they are generated or periodically. Similarly, the violation reporter 208 can send multiple incident records to the DLP system 108 in batches or sequentially. If a violation is detection, the violation reporter 208 may notify a system administrator (e.g., send an email or update a log file) about the policy violation incident, and may send information about the policy violation incident to the DLP service provider (e.g., DLP system 108). The information sent to the DLP service provider may identify, for example, the DLP policy being violated, the type of data being transferred, the destination entity specified to receive the data transfer, or other information concerning the violation, an identifier of the user or the client computing system 102 that caused the violation, as well as other information that may be helpful in remedying or recording the incidents.

In another embodiment, the DLP agent 120 includes a policy manager 210 that can be used to define DLP policies and store them in the policy data store 212. The policy may also be used to monitor and detect for other types of DLP violations. For example, the policy may also specify sensitive data that should trigger a DLP policy if detected in the outbound data transfers 203. The policy manager 210 may create DLP policies based on user input, such as from the user of the client computing system 102 or an administrator of an organization providing the client computing system 102. Alternatively, the policy manager 210 may receive DLP policies from a DLP service provider (e.g., DLP system 108) and store them in the policy data store 212. The DLP system 108 may be configured to receive the incident record of the violation from the violation reporter 208, and may be configured to perform some remedial or reporting operation as would be appreciated by one of ordinary skill in the art having the benefit of this disclosure.

It should be noted that the DLP system 108 may include other components for monitoring outbound data transfers 203 and detecting violations of the DLP policy, as well as other types of policies. Details regarding these other components have not been included so as to not obscure the description of the present embodiments.

Figure 2B:
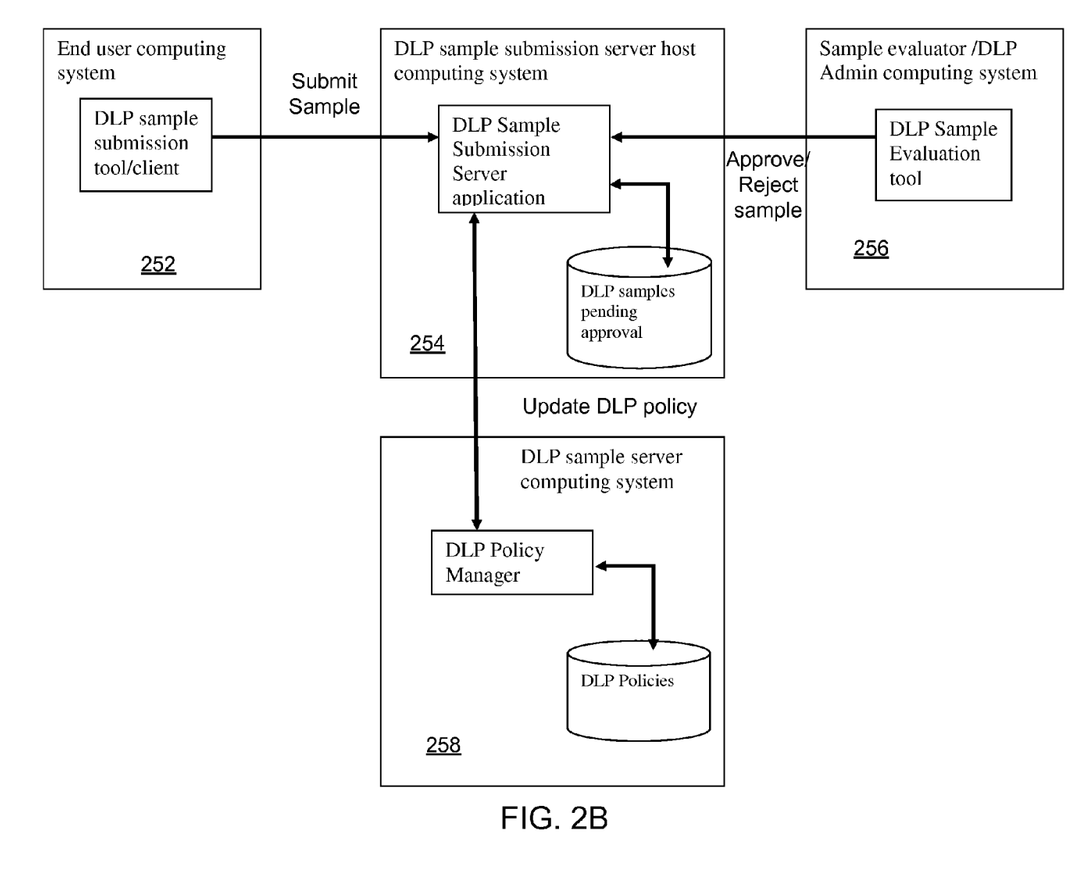
FIG. 2B is a block diagram of another embodiment for DLP submission.

FIG. 2B is a block diagram of another embodiment for DLP submission. In this embodiment, an end user computing system 252 executes a DLP sample submission tool/client that submits a sample to a DLP sample submission server host computing system 254. The DLP sample submission server host computing system 254 executes a DLP sample submission server application that receives the sample from the DLP sample submission tool/client on the end user computing system 252. The DLP sample submission server application maintains a data store of DLP samples that are pending approval. The DLP sample submission server application may send the sample to a sample evaluator, such as DLP administrator's computing system 256. The administrator's computing system 256 may execute a DLP sample evaluation tool to determine whether to approve or reject the submitted sample. The DLP sample evaluation tool approves or rejects the sample and notifies the DLP sample submission server application on the server host computing system 254. If the sample is approved, the DLP sample submission server application instructs a DLP sample server computing system 258 to update one or more DLP policies. The DLP sample server computing system may execute a DLP policy manager that receives the approved sample, and updates one or more DLP policies stored in a data store. The DLP policy manager may also ensure that the DLP policies are updated throughout the protected environment, such as pushing the updated DLP policies to the different DLP products that use the DLP policies to protect against violations.

Figure 3A:
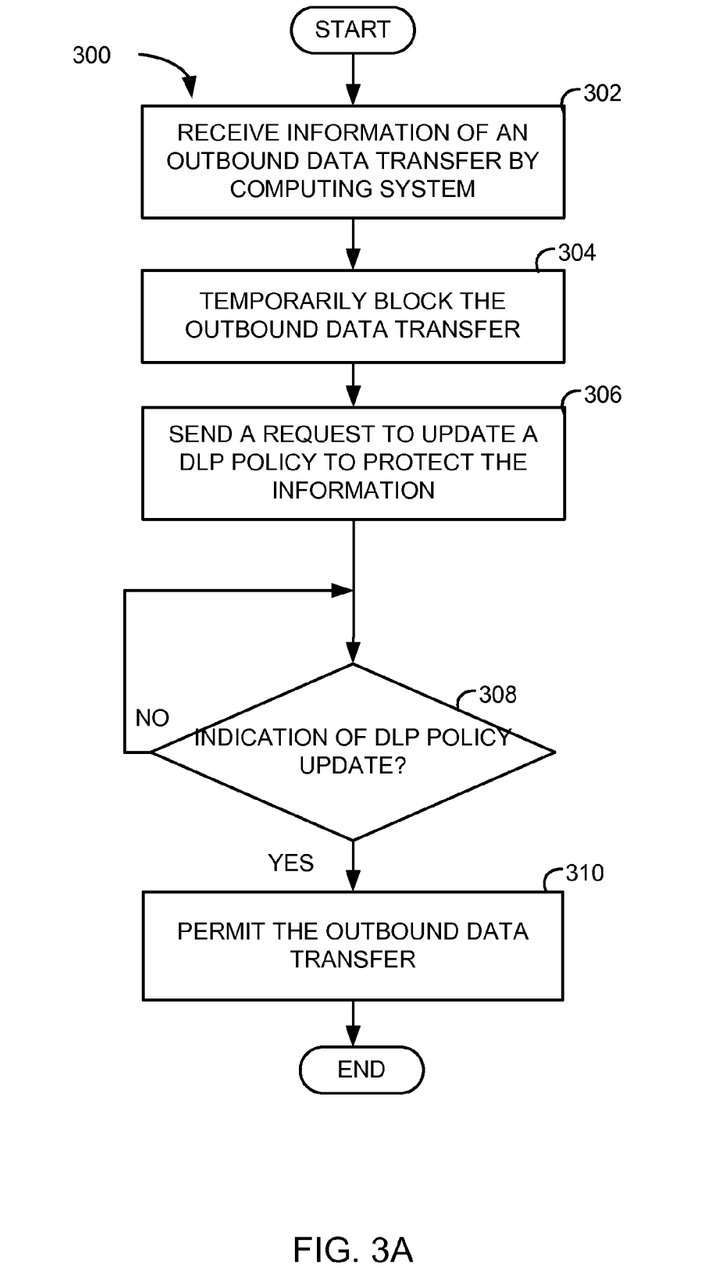
FIG. 3A is a flow diagram of one embodiment of a method of submitting information to be protected before permitting an outbound data transfer with the information.

FIG. 3A is a flow diagram of one embodiment of a method 300 of submitting information to be protected before permitting an outbound data transfer with the information. The method 300 is performed by processing logic that may comprise hardware (circuitry, dedicated logic, etc.), software (such as is run on a general purpose computing system or a dedicated machine), or a combination of both. In one embodiment, the client computing system 102 of FIG. 1 performs the method 300. In one embodiment, the server computing system 106 of FIG. 1 performs the method 300. In another embodiment, the DLP submission tool 122 of FIGS. 1 and 2A performs the method 300. Alternatively, other components of the client computing system 102, server computing system 106, or of both can be configured to perform some or all of the method 300. Alternatively, one or more of the computing systems of FIG. 2B can be used to perform some or all of the method 300.

Referring to FIG. 3A, processing logic begins method 300 by receiving information of an outbound data transfer by the client computing system (block 302). The processing logic temporarily blocks the outbound data transfer (block 304), and sends a request to a DLP system to update a DLP policy to protect the information before permitting the outbound data transfer (block 306). The processing logic determines if there is an indication that the DLP policy has been updated (block 308). If at block 308 no indication is received, the processing logic waits until an indication is received. When at block 308 the indication is received, the processing logic permits the outbound data transfer (block 310).

In yet a further embodiment, the processing logic receives a submission from an email client plug-in executing in connection with an email application. The submission includes an email message with the information and the request to update the DLP policy to protect the information before permitting the email message. In another embodiment, the processing logic receives a submission from a browser plug-in executing in connection with a browser application. The submission request includes a web transfer with the information and the request to update the DLP policy to protect the information before permitting the web transfer.

In another embodiment, the processing logic receives a submission via a user interface provided by the DLP agent. The submission may include a designation that the information of the outbound data transfer be protected by the DLP policy. The processing logic then creates the request to send to the DLP system.

In one embodiment, the request includes the information of the outbound data transfer to be protected, category information associated with the information to be protected, and expiration information associated with the information to be protected. Alternatively, the request may include more or less information as would be appreciated by one of ordinary skill in the art having the benefit of this disclosure. In another embodiment, the request includes instructions to a mail server to temporarily block email messages from an email account that satisfy one or more conditions. The conditions may be senders, recipients, content, subject line, or other conditions that can trigger the submission operations as described herein. This may be used to all a user to send the message, but before the email message is routed to its destination, the information can be submitted to the DLP system to update the DLP policies as described herein. The request may also include instructions to the DLP system to update the DLP policy to protect the information before permitting the email messages from being routed to their destinations.

In yet another embodiment, the processing logic receives a second indication that the request is rejected by an approval process on the server computing system. In one embodiment, the processing logic permits the outbound data transfer upon receiving the second indication. For example, the request may be rejected because the outbound data transfer is determined to not include protected information. Alternatively, the second indication may be used to trigger other operations as would be appreciated by one of ordinary skill in the art having the benefit of this disclosure.

In other embodiments, the processing logic can be configured to pre-calculate and update DLP policies prior to distribution of sensitive documents, such as web documents, web transfers, documents, attachments, web postings, or other outbound data transfers. The processing logic can be implemented in a plug-in to another application, such as an email client plug-in. For example, a CEO of a company can use the email plug-in to designate an email message as having information to be protected. When designating the email message as having information to be protected, the processing logic can submit a request that this information be updated in the DLP policies. For example, the DLP system may use DCM, EDM, IDM, VML, or any combination thereof, in the DLP policies. The processing logic submits the request with a submission of information. The DLP system can create a new policy or update an existing policy to protect the designated information. As described herein, conventional DLP products can perform content analysis but cannot guarantee classification of this recent information as being protected due to its recent creation, for example. The DLP technologies, such as DCM, EDM, IDM, and VML can help detect for protected information, but can only successfully detect the protected information when the DLP technologies have the information beforehand. The embodiments described herein allow one or more user to help in defining the comprehensive DLP policies by submitting information as it is created. For example, an organization may provide this ability to executive level employees to all them to designate the information as protected when it is being created.

In other embodiments, the processing logic can provide an interface to accept samples of protected information, such as confidential information. For end users, the processing logic can provide options to submit samples by various means. In one embodiment, the user interface can be integrated with mail clients. In this embodiment, the email message may be temporarily blocked until the plug-in receives an indication that the DLP policy has been updated with the information in the email massage. In another embodiment, an interface can be integrated with a mail server, and can be used for automatic handling of email message and documents based on the user inputs, such as the conditions described above. For example, once the DLP policy is updated, the email server can route the email messages to their respective destinations. In another embodiment, the processing logic updates the policies, with the submitted samples and updates the policies with enforcement points. For example, once the DLP policy has been updated, the DLP system can ensure that the update policies are provided to the DLP agents or other DLP products within an organization. In one embodiment, the IDM profiles may be updated with the submitted samples. Unlike email technologies that use tags to mark email messages as having protected information, the embodiments described herein update the DLP policies so that the information can be protected for all types of outbound transfers, not just email messages. As such, a person receiving the email message having the protected information could not cut and paste the information into a new message, or save into a document and transfer the document, and may be even be able to print the information or transfer to a USB drive because the DLP policies have been updated to protect the information. It should be noted that other workflows can be introduced if approval of the submissions are necessary. For example, once a user has submitted samples, the DLP system may allow an administrator to examine the samples and may accept the sample or may reject the sample. The administrator may reject the submission if it is a poor or false sample. Once the administrator has approved the submission, the submitted sample may be incorporated into one or more policies, such as VML, IDM, or DCM. The DLP system can also send notification to the submitted that it has been approved. In some cases, the notification can be sent to a mail client or other application to trigger one or more additional operations, such as allowing the outbound data transfer, or routing an email to its destination.

In one embodiment, the processing logic accepts sample documents or contents of an outbound data transfer from one or more users at one or more end points. In one embodiment, the user submits a sample with the following: the document, category information, and expiration information. The processing logic may return a key to the user at the end point. The key may be used for querying a status of a submission. For example, when queried, the processing logic may return a status that the submission is under evaluation, incorporated into the DLP policy, pending, granted, or the like. These operations may be implemented in application programming interfaces (APIs) to allow for $3^{rd}$ party integration. For example, the APIs can be integrated into share-point servers, mail clients, windows explorer, a third-party application with plug-in support, or the like.

In another embodiment, the processing logic can be used as a sample submission portal that is a user interface based client that can internally implement the programmable interfaces. For example, these portals can be implemented on end points within an organization.

Figure 3B:
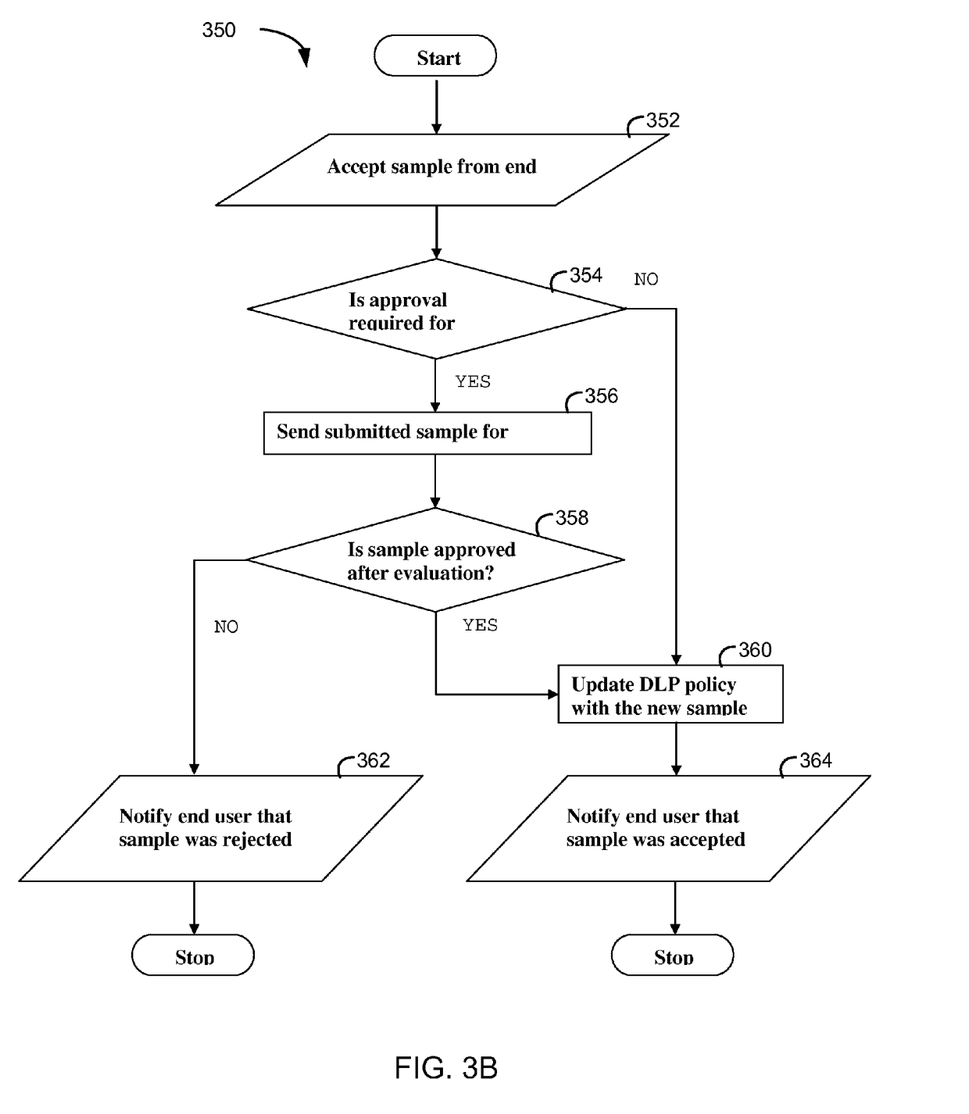
FIG. 3B is a flow diagram of one embodiment of a method of a submission approval process.

FIG. 3B is a flow diagram of one embodiment of a method 350 of a submission approval process. The method 350 is performed by processing logic that may comprise hardware (circuitry, dedicated logic, etc.), software (such as is run on a general purpose computing system or a dedicated machine), or a combination of both. In one embodiment, the client computing system 102 of FIG. 1 performs the method 300. In one embodiment, the server computing system 106 of FIG. 1 performs the method 300. In another embodiment, the DLP submission tool 122 of FIGS. 1 and 2A performs the method 300. In another embodiment, the DLP sample evaluation tool of FIG. 2B. Alternatively, other components of the client computing system 102, server computing system 106, or of both can be configured to perform some or all of the method 300. Alternatively, one or more of the computing systems of FIG. 2B can be used to perform some or all of the method 300.

Referring to FIG. 3B, processing logic begins method 350 by accepting a sample from an end user (block 352). The processing logic determines if approval is required for the submitted sample (block 354). If not, the processing logic updates the DLP policy with the new sample (block 360), and notifies the end user that the sample has been accepted (block 364), and the method 350 ends. However, if approval is required at block 354, the processing logic sends the submitted sample for approval (block 356), and the processing logic determines if the sample is approved after evaluation (block 358). If the sample is approved, the processing logic updates the DLP policy with the new sample (block 360), and notifies the end user that the sample has been accepted (block 364), and the method 350 ends. However, if the sample is not approved at block 358, the processing logic can notify the end user that the sample was rejected (block 362), and the method 350 ends. Alternatively, other approval processes may be used as would be appreciated by one of ordinary skill in the art having the benefit of this disclosure.

Figure 4:
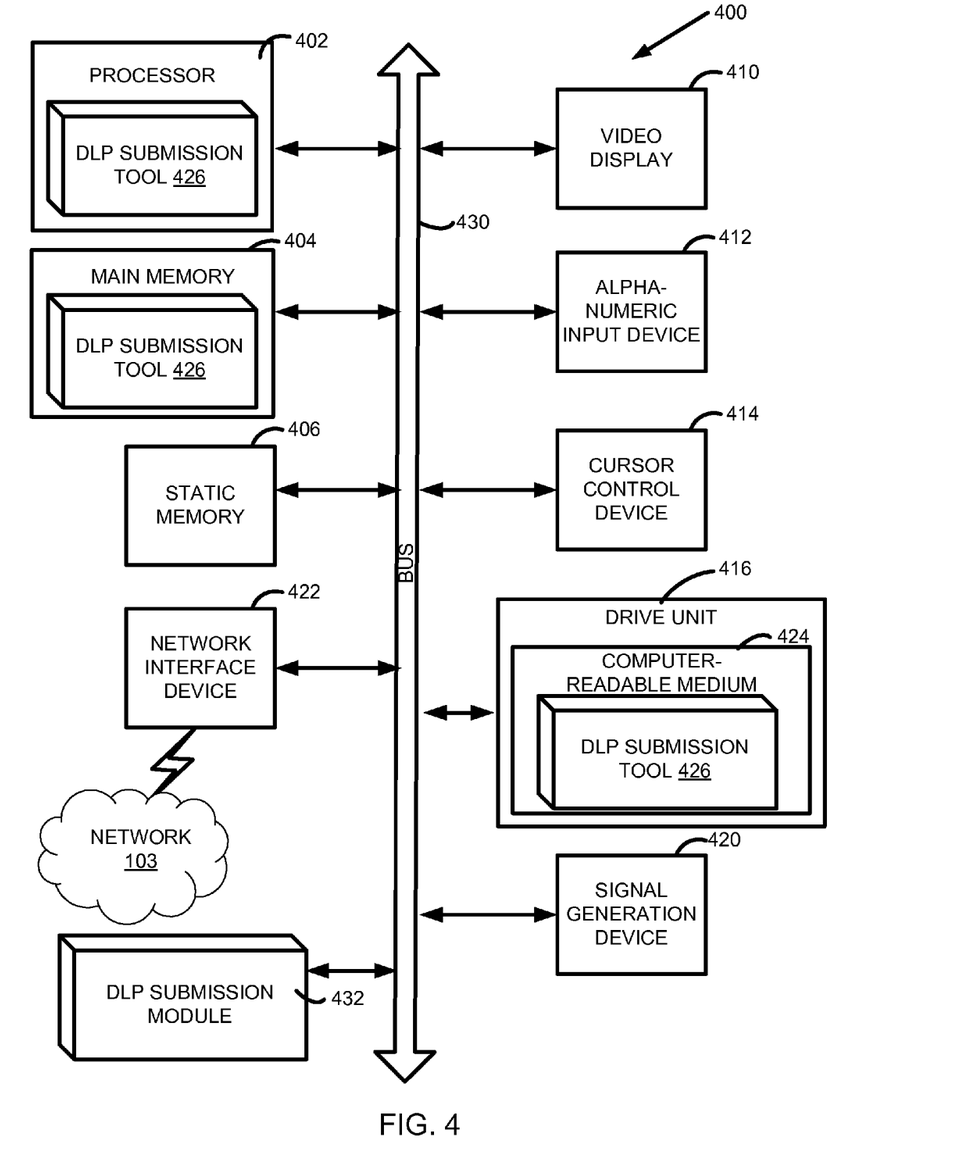
FIG. 4 illustrates a diagrammatic representation of a machine in the exemplary form of a computing system within which a set of instructions, for causing the machine to perform any one or more of the methodologies described herein, may be executed.

FIG. 4 illustrates a diagrammatic representation of a machine in the exemplary form of a computing system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as method 300 of FIG. 3A.

The exemplary computing system 400 includes a processor 402, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a data storage device 418, which communicate with each other via a bus 406.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute the processing logic for DLP submission tool 426 for performing the operations and steps discussed herein.

The computing system 400 may further include a network interface device 422. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions (e.g., DLP submission tool 426) embodying any one or more of the methodologies or functions described herein. The DLP submission tool 426 may also reside, completely or at least partially, within the main memory 404 and/or within the processor 402 during execution thereof by the computing system 400, the main memory 404, and the processor 402 also constituting computer-readable media. The DLP submission tool 426 may further be transmitted or received over a network 420 via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The DLP submission module 432, components, and other features described herein (for example in relation to FIGS. 1-2) can be implemented as discrete hardware components or integrated in the functionality of hardware components such as ASICS, FPGAs, DSPs, or similar devices. The DLP submission module 432 may implement operations of DLP submission tool as described herein with respect to FIG. 3A. In addition, the DLP submission module 432 can be implemented as firmware or functional circuitry within hardware devices. Further, the DLP submission module 432 can be implemented in any combination hardware devices and software components.

In the above description, well-known structures and devices are shown in block diagram form, rather than in detail, in order to avoid obscuring the present invention. Some portions of the description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "storing", "monitoring", "creating", "generating", "sending", "intercepting," "capturing," "mapping", "generating," or the like, refer to the actions and processes of a computing system, or similar electronic computing system that manipulates and transforms data represented as physical (e.g., electronic) quantities within the computing system's registers and memories into other data similarly represented as physical quantities within the computing system's memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. As discussed above, such a computer program may be stored in a computer readable medium.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a client computing system programmed to perform the following, comprising:
    receiving, by a data loss prevention (DLP) agent executing on the client computing system, information of an outbound data transfer by the client computing system;
    receiving a first indication that the information of the outbound data transfer is to be protected by a DLP policy;
    temporarily blocking the outbound data transfer;
    sending, by the DLP agent, a request to a DLP system to update the DLP policy based on the first indication and while temporarily blocking the outbound data transfer, wherein the request identifies the information of the outbound data transfer to be protected, and comprises at least one of category information associated with the information to be protected or expiration information associated with the information to be protected;
    receiving a second indication that the DLP policy is updated to protect the information; and
    after receiving the second indication, permitting the outbound data transfer.

2. The method of claim 1, further comprising receiving a submission from an email client plug-in executing in connection with an email application executing on the client computing system, the submission comprising an email message with the information and the request to update the DLP policy to protect the information before permitting the email message, wherein the submission comprises the first indication.

3. The method of claim 1, further comprising receiving a submission from a browser plug-in executing in connection with a browser application executing on the client computing system, the submission comprising a web transfer with the information and the request to update the DLP policy to protect the information before permitting the web transfer, wherein the submission comprises the first indication.

4. The method of claim 1, further comprising:
    receiving a submission via a user interface provided by the DLP agent, the submission including a designation that the information of the outbound data transfer be protected by the DLP policy, wherein the submission comprises the first indication; and
    creating the request by the DLP agent.

5. The method of claim 4, wherein the request comprises:
    the information of the outbound data transfer to be protected;
    category information associated with the information to be protected; and
    expiration information associated with the information to be protected.

6. The method of claim 4, wherein the request comprises:
    instructions to a mail server to temporarily block email messages from an email account that satisfy one or more conditions; and
    instructions to the DLP system to update the DLP policy to protect the information before permitting the email messages from being routed to their destinations.

7. The method of claim 1, further comprising receiving another indication that the request is rejected by an approval process on a server computing system.

8. A computing system, comprising:
    a memory; and
    a processor coupled with the memory to execute a data loss prevention (DLP) agent to:
    receive information of an outbound data transfer by a client computing system;
    receive a first indication that the information of the outbound data transfer be protected by a DLP policy;
    temporarily block the outbound data transfer;
    send, by the DLP agent, a request to a DLP system to update the DLP policy based on the first indication and while temporarily blocking the outbound data transfer, wherein the request identifies of the information of the outbound data transfer to be protected, and comprises at least one of category information associated with the information to be protected or expiration information associated with the information to be protected;
    receive a second indication that the DLP policy is updated to protect the information; and
    permit the outbound data transfer after receiving the second indication.

9. The computing system of claim 8, wherein the DLP agent is further configured to receive a submission from an email client plug-in executing in connection with an email application executing on the client computing system, the submission comprising an email message with the information and the request to update the DLP policy to protect the information before permitting the email message, wherein the submission comprises the first indication.

10. The computing system of claim 8, wherein the DLP agent is further configured to receive a submission from a browser plug-in executing in connection with a browser application executing on the client computing system, the submission request comprising a web transfer with the information and the information and the request to update the DLP policy to protect the information before permitting the web transfer, wherein the submission comprises the first indication.

11. The computing system of claim 8, wherein the DLP agent is further configured to:
receive a submission via a user interface provided by the DLP agent to request that the information of the outbound data transfer information be protected by the DLP policy, wherein the submission comprises the first indication; and
create the request by the DLP agent.

12. The computing system of claim 8, wherein the request comprises:
the information of the outbound data transfer to be protected;
category information associated with the information to be protected; and
expiration information associated with the information to be protected.

13. The computing system of claim 8, wherein the request comprises:
instructions to a mail server to temporarily block email messages from an email account that satisfy one or more conditions; and
instructions to the DLP system to update the DLP policy to protect the information before permitting the email messages from being routed to their destinations.

14. A non-transitory computer readable storage medium including instructions that, when executed by a processor, cause the processor to perform a method comprising:
receiving, by a data loss prevention (DLP) agent executing on a client computing system, information of an outbound data transfer by the client computing system;
receiving a first indication that the information of the outbound data transfer is to be protected by a DLP policy;
temporarily blocking the outbound data transfer;
sending, by the DLP agent, a request to a DLP system to update the DLP policy based in the first indication and while temporarily blocking the outbound data transfer, wherein the request identifies the information of the outbound data transfer to be protected, and comprises at least one of category information associated with the information to be protected or expiration information associated with the information to be protected;
receiving a second indication that the DLP policy is updated to protect the information; and
after receiving the second indication, permitting the outbound data transfer.

15. The computer readable storage medium of claim 14, wherein the method further comprises receiving a submission from an email client plug-in executing in connection with an email application executing on the client computing system, the submission comprising an email message with the information and the request to update the DLP policy to protect the information before permitting the email message, wherein the submission comprises the first indication.

16. The computer readable storage medium of claim 14, wherein the method further comprises receiving a submission from a browser plug-in executing in connection with a browser application executing on the client computing system, the submission request comprising a web transfer with the information and the information and the request to update the DLP policy to protect the information before permitting the web transfer, wherein the submission comprises the first indication.

17. The computer readable storage medium of claim 14, wherein the method further comprises
receiving a submission via a user interface provided by the DLP agent to request that the information of the outbound data transfer information be protected by the DLP policy, wherein the submission comprises the first indication; and
creating the request by the DLP agent.

18. The computer readable storage medium of claim 17, wherein the request comprises:
the information of the outbound data transfer to be protected;
category information associated with the information to be protected; and
expiration information associated with the information to be protected.

19. The computer readable storage medium of claim 17, wherein the request comprises:
instructions to a mail server to temporarily block email messages from an email account that satisfy one or more conditions; and
instructions to the DLP system to update the DLP policy to protect the information before permitting the email messages from being routed to their destinations.

20. The computer readable storage medium of claim 14, wherein the method further comprises receiving another indication that the request is rejected by an approval process on a server computing system.

* * * * *